US008503110B2

(12) United States Patent  (10) Patent No.: US 8,503,110 B2
Oshita  (45) Date of Patent: Aug. 6, 2013

(54) LENS SYSTEM, WIDE-ANGLE LENS, OPTICAL APPARATUS EQUIPPED WITH LENS SYSTEM, AND METHOD FOR MANUFACTURING LENS SYSTEM

(75) Inventor: Koichi Oshita, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/395,234
(22) PCT Filed: Sep. 7, 2010
(86) PCT No.: PCT/JP2010/065287
§ 371 (c)(1),
(2), (4) Date: Mar. 9, 2012
(87) PCT Pub. No.: WO2011/030743
PCT Pub. Date: Mar. 17, 2011

(65) Prior Publication Data
US 2012/0170135 A1 Jul. 5, 2012

(30) Foreign Application Priority Data
Sep. 9, 2009 (JP) .................................. 2009-207778

(51) Int. Cl.
*G02B 13/04* (2006.01)
(52) U.S. Cl.
USPC .......................................................... 359/753
(58) Field of Classification Search
USPC .................................................. 359/749–753
See application file for complete search history.

(56) References Cited

U.S. PATENT DOCUMENTS

| | | |
|---|---|---|
| 2,849,918 A | 9/1958 | Eismann et al. |
| 4,257,678 A | 3/1981 | Momiyama et al. |
| 4,950,055 A | 8/1990 | Tatsuno |
| 5,087,989 A | 2/1992 | Igarashi |
| 5,198,931 A | 3/1993 | Igarashi |
| 6,384,987 B1 | 5/2002 | Sensui |
| 2010/0201782 A1 | 8/2010 | Yamada et al. |

FOREIGN PATENT DOCUMENTS

| | | |
|---|---|---|
| JP | 33-002928 B1 | 4/1958 |
| JP | 54-044519 A | 4/1979 |
| JP | 02-051115 A | 2/1990 |
| JP | 02-277015 A | 11/1990 |
| JP | 08-166538 A | 6/1996 |
| JP | 2000-235145 A | 8/2000 |
| JP | 2010-186011 A | 8/2010 |

OTHER PUBLICATIONS

English translation of International Preliminary Report on Patentability for International Patent Application No. PCT/JP2010/065287, Apr. 11, 2012.

*Primary Examiner* — Scott J Sugarman
(74) *Attorney, Agent, or Firm* — Miles & Stockbridge P.C.

(57) ABSTRACT

With comprising, in order from an object side: a first lens L1 constructed by a negative meniscus lens having a convex surface facing the object side; a cemented lens component CL1 having positive refractive power as a whole constructed by a second lens L2 having positive refractive power and a third lens L3 having negative refractive power; a fourth lens L4 having negative refractive power; a fifth lens L5 having positive refractive power; and a sixth lens L6 having positive refractive power, and the following expression being satisfied:

$0.01 < d2/(-f1) < 0.15$ where d2 denotes a distance along an optical axis between the first lens and the second lens, and f1 denotes a focal length of the first lens, a compact lens system having superb optical performance with correcting various aberrations, a wide-angle lens, an optical apparatus equipped therewith, and a method for manufacturing the lens system are provided.

16 Claims, 13 Drawing Sheets

LENS SYSTEM, WIDE-ANGLE LENS, OPTICAL APPARATUS EQUIPPED WITH LENS SYSTEM, AND METHOD FOR MANUFACTURING LENS SYSTEM

TECHNICAL FIELD

The present invention relates to a lens system, a wide-angle lens, an optical apparatus equipped with the lens system, and a method for manufacturing the lens system.

BACKGROUND ART

A so-called retrofocus type lens, in which the most object side lens has negative refractive power, has been known as an image-taking wide-angle lens (for example, see Japanese Patent Application Laid-Open No. 2000-235145).

DISCLOSURE OF THE INVENTION

Problems to be Solved by the Invention

However, a conventional retrofocus lens has a problem that the total lens length thereof is large.

The present invention is made in view of the above-described problem, and has an object to provide a lens system being compact and having superb optical performance with excellently correcting various aberrations, a wide-angle lens, an optical apparatus equipped with the lens system, and a method for manufacturing the lens system.

Way to Solve the Problems

In order to solve the problem, according to a first aspect of the present invention, there is provided a lens system comprising, in order from an object side: a first lens constructed by a negative meniscus lens having a convex surface facing the object side; a cemented lens component having positive refractive power as a whole constructed by a second lens having positive refractive power cemented with a third lens having negative refractive power; a fourth lens having negative refractive power; a fifth lens having positive refractive power; and a sixth lens having positive refractive power, and the following conditional expression (1) being satisfied:

$$0.01 < d2/(-f1) < 0.15 \qquad (1)$$

where d2 denotes a distance along an optical axis between the first lens and the second lens, and f1 denotes a focal length at d-line of the first lens.

In the first aspect of the present invention, it is preferable that the following conditional expression (2) is satisfied:

$$-5 < (r2+r1)/(r2-r1) < -2 \qquad (2)$$

where r1 denotes a radius of curvature of the object side lens surface of the first lens, and r2 denotes a radius of curvature of the image side lens surface of the first lens.

In the first aspect of the present invention, it is preferable that an aperture stop is disposed between the cemented lens component and the fourth lens.

In the first aspect of the present invention, it is preferable that the following conditional expression (3) is satisfied:

$$0.0 < fb/fa < 1.2 \qquad (3)$$

where fa denotes a focal length at d-line of a front lens group composed of the first lens and the cemented lens component, and fb denotes a focal length at d-line of a rear lens group composed of the fourth lens, the fifth lens and the sixth lens.

In the first aspect of the present invention, it is preferable that the following conditional expression (4) is satisfied:

$$-0.25 < (rb+r3)/(rb-r3) < 0.00 \qquad (4)$$

where rb denotes a radius of curvature of the image side lens surface of the fifth lens, and r3 denotes a radius of curvature of the object side lens surface of the second lens.

In the first aspect of the present invention, it is preferable that the following conditional expression (5) is satisfied:

$$0.7 < D/f < 1.2 \qquad (5)$$

where D denotes a distance along the optical axis between the object side lens surface of the first lens and the image side lens surface of the sixth lens, and f denotes a focal length of the lens system.

In the first aspect of the present invention, it is preferable that at least one lens surface of the sixth lens is an aspherical surface.

In the first aspect of the present invention, it is preferable that the fourth lens is cemented with the fifth lens.

According to a second aspect of the present invention, there is provided a wide-angle lens having a configuration of the lens system according to the first aspect.

According to a third aspect of the present invention, there is provided an optical apparatus equipped with the lens system according to the first aspect.

According to a fourth aspect of the present invention, there is provided a method for manufacturing a lens system comprising steps of: disposing, in order from an object side along an optical axis, a first lens constructed by a negative meniscus lens having a convex surface facing the object side, a cemented lens component constructed by a second lens having positive refractive power cemented with a third lens having negative refractive power, a fourth lens having negative refractive power, a fifth lens having positive refractive power and a sixth lens having positive refractive power; and disposing each lens with satisfying the following conditional expression (1):

$$0.01 < d2/(-f1) < 0.15 \qquad (1)$$

where d2 denotes a distance along the optical axis between the first lens and the second lens, and f1 denotes a focal length at d-line of the first lens.

In the fourth aspect of the present invention, it is preferable that the method further comprising a step of:

disposing each lens with satisfying the following conditional expression (2):

$$-5 < (r2+r1)/(r2-r1) < -2 \qquad (2)$$

where r1 denotes a radius of curvature of the object side lens surface of the first lens, and r2 denotes a radius of curvature of the image side lens surface of the first lens.

In the fourth aspect of the present invention, it is preferable that the method further comprising a step of:

disposing an aperture stop between the cemented lens component and the fourth lens.

In the fourth aspect of the present invention, it is preferable that the method further comprising a step of:

disposing each lens with satisfying the following conditional expression (3):

$$0.0 < fb/fa < 1.2 \qquad (3)$$

where fa denotes a focal length at d-line of a front lens group composed of the first lens and the cemented lens component, and fb denotes a focal length at d-line of a rear lens group composed of the fourth lens, the fifth lens and the sixth lens.

In the fourth aspect of the present invention, it is preferable that the method further comprising a step of:

disposing each lens with satisfying the following conditional expression (4):

$$-0.25 < (rb+r3)/(rb-r3) < 0.00 \quad (4)$$

where rb denotes a radius of curvature of the image side lens surface of the fifth lens, and r3 denotes a radius of curvature of the object side lens surface of the second lens.

In the fourth aspect of the present invention, it is preferable that the method further comprising a step of:

disposing each lens with satisfying the following conditional expression (5):

$$0.7 < D/f < 1.2 \quad (5)$$

where D denotes a distance along the optical axis between the object side lens surface of the first lens and the image side lens surface of the sixth lens, and f denotes a focal length of the lens system.

Effect of the Invention

With composing the present invention in this manner, it becomes possible to obtain a lens system being compact and having superb optical performance with excellently correcting various aberrations, a wide-angle lens, an optical apparatus equipped with the lens system, and a method for manufacturing the lens system.

BRIEF DESCRIPTION OF THE DRAWINGS

FIGS. 11A and 11B show an electronic still camera equipped with a wide-angle lens according to the present embodiment, in which FIG. 11A is a front view, and FIG. 11B is a rear view.

EMBODIMENT FOR CARRYING OUT THE INVENTION

A preferred embodiment of the present application will be explained below with reference to accompanying drawings.

Figure 1:
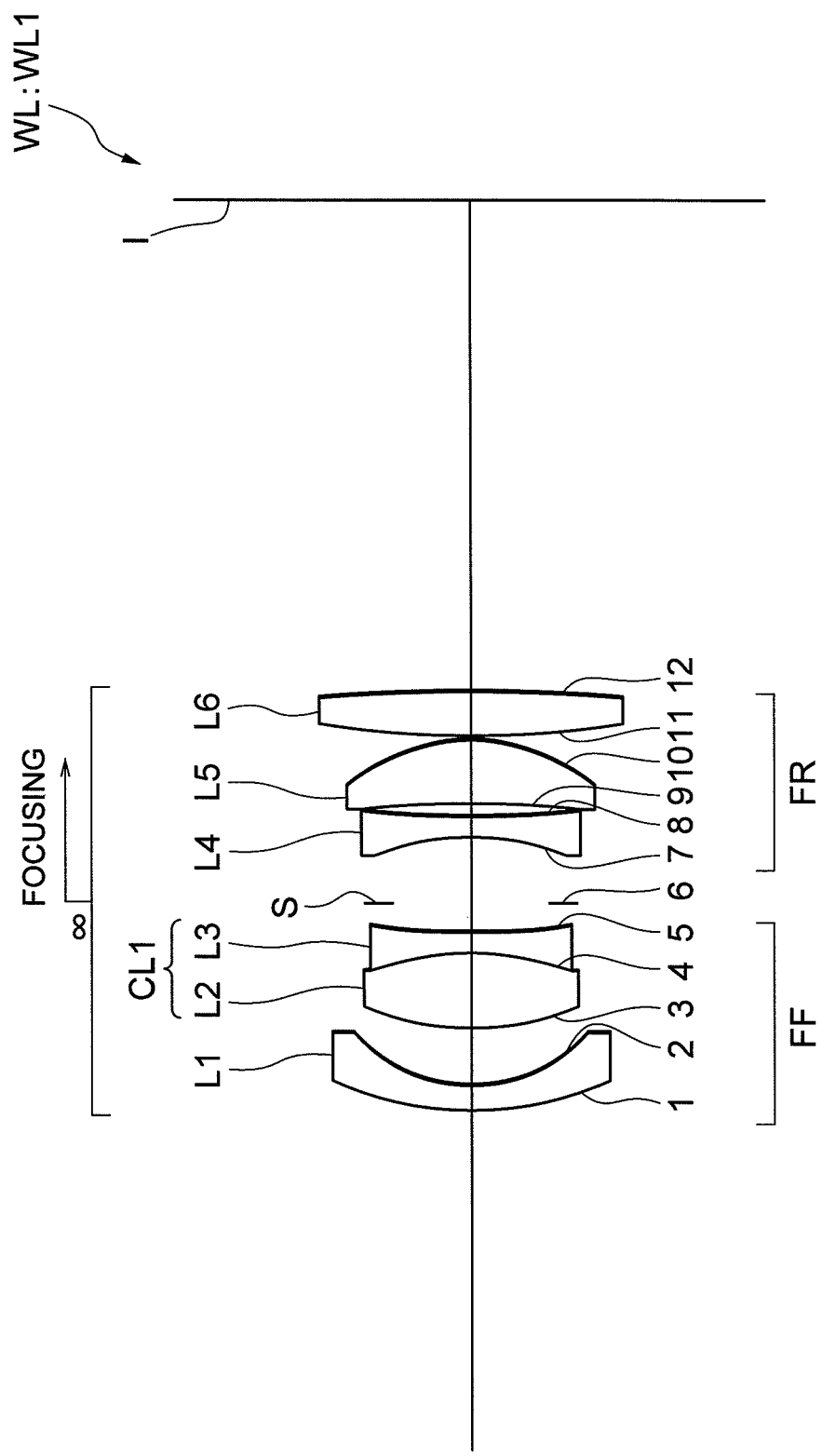
FIG. 1 is a sectional view showing a wide-angle lens according to Example 1.

As shown in FIG. 1, a wide-angle lens WL having a configuration of a lens system according to the present embodiment is a so-called retrofocus type lens having a five-group-six-lens configuration and is composed of, in order from an object side, a first lens L1 constructed by a negative meniscus lens having a convex surface facing the object side, a cemented lens component CL1 having positive refractive power as a whole constructed by a second lens L2 having positive refractive power cemented with a third lens L3 having negative refractive power, a fourth lens L4 having negative refractive power, a fifth lens L5 having positive refractive power, and a sixth lens L6 having positive refractive power. Moreover, in a wide-angle lens WL, a front lens group FF is composed of the first lens L1 and the cemented lens component CL1, and a rear lens group FR is composed of the fourth lens L4, the fifth lens L5 and the sixth lens L6. With this configuration, it becomes possible to obtain a wide-angle lens WL being compact and having superb optical performance with excellently correcting various aberrations. Incidentally, although a wide-angle lens WL with a five-group-six-lens configuration is explained here, the present invention is not limited to this, and a retrofocus type lens with a four-group-six-lens configuration shown in FIG. 3 may also be possible.

Moreover, a wide-angle lens WL according to the present embodiment preferably satisfies the following conditional expression (1):

$$0.01 < d2/(-f1) < 0.15 \quad (1)$$

where d2 denotes a distance along an optical axis between the first lens L1 and the second lens L2, and f1 denotes a focal length of the first lens L1.

Conditional expression (1) defines a ratio of the distance d2 along the optical axis between the first lens L1 and the second lens L2 to the focal length f1 of the first lens L1. When the value of conditional expression (1) is equal to or exceeds the upper limit of conditional expression (1), the distance d2 along the optical axis between the first lens L1 and the second lens L2 increases, or refractive power of the first lens L1 increases, so that it becomes difficult to correct barrel type distortion which is a typical defect of a retrofocus type lens. Moreover, the first lens L1 becomes large and the total lens length becomes large, so that it is undesirable. In order to secure the effect of the present embodiment, it is preferable to set the upper limit of conditional expression (1) to 0.05, so that it becomes possible to obtain excellent performance with making the lens compact. On the other hand, when the value of conditional expression (1) is equal to or falls below the lower limit of conditional expression (1), the first lens L1 and the second lens L2 become too close, so that it becomes difficult to correct high order spherical aberration. Alternatively, refractive power of the first lens L1 becomes too small, so that Petzval sum becomes large. As a result, it becomes difficult to secure flatness of the image plane, so that it is undesirable.

Moreover, a wide-angle lens WL according to the present embodiment preferably satisfies the following conditional expression (2):

$$-5 < (r2+r1)/(r2-r1) < -2 \quad (2)$$

where r1 denotes a radius of curvature of the object side lens surface of the first lens L1, and r2 denotes a radius of curvature of the image side lens surface of the first lens L1.

Conditional expression (2) defines a shape of the negative meniscus lens composing the first lens L1. When the value of conditional expression (2) is equal to or exceeds the upper limit of conditional expression (2), correction of spherical aberration becomes insufficient, and excellent optical performance cannot be obtained, so that it is undesirable. On the other hand, when the value of conditional expression (2) is equal to or falls below the lower limit of conditional expression (2), correction of spherical aberration becomes excessive, and excellent optical performance cannot be obtained, so that it is undesirable.

Moreover, in a wide-angle lens WL according to the present embodiment, an aperture stop S is preferably disposed between the cemented lens component CL1 and the fourth lens L4. With this configuration, it becomes possible to excellently correct coma. Moreover, a lens frame may substitute the function of an aperture stop without disposing a member as an aperture stop.

Moreover, a wide-angle lens WL according to the present embodiment preferably satisfies the following conditional expression (3):

$$0.0 < fb/fa < 1.2 \quad (3)$$

where fa denotes a focal length at d-line of the front lens group FF constructed by the first lens L1 and the cemented lens component CL1, and fb denotes a focal length at d-line of the rear lens group FR constructed by the fourth lens L4, the fifth lens L5 and the sixth lens L6.

Conditional expression (3) defines a ratio of the combined focal length fa of the front lens group FF constructed by the first lens L1 through the third lens L3 to the combined focal length fb of the rear lens group FR constructed by the fourth lens L4 through the sixth lens L6. When the value of conditional expression (3) is equal to or exceeds the upper limit of conditional expression (3), the focal length fa of the front lens group FF becomes small, and inclination of light ray in the vicinity of the aperture stop S becomes large, so that the diameter of the front lens group FF becomes large and astigmatism at the maximum angle of view becomes difficult to be corrected. Accordingly, it is undesirable. In order to secure the effect of the present embodiment, it is preferable to set the upper limit of conditional expression (3) to 0.6, so that it becomes possible to excellently correct astigmatism. On the other hand, when the value of conditional expression (3) is equal to or falls below the lower limit of conditional expression (3), refractive power of the second lens L2 becomes small, and the focal length fa of the front lens group FF as a whole becomes long, so that it becomes difficult to excellently correct barrel type distortion. Accordingly, it is undesirable.

Moreover, a wide-angle lens WL according to the present embodiment preferably satisfies the following conditional expression (4):

$$-0.25 < (rb+r3)/(rb-r3) < 0.00 \quad (4)$$

where rb denotes a radius of curvature of the image side lens surface of the fifth lens L5, and r3 denotes a radius of curvature of the object side lens surface of the second lens L2.

Conditional expression (4) defines the shape of the object side surface of the second lens L2 and the shape of the image side surface of the fifth lens L5. When the value of conditional expression (4) is equal to or exceeds the upper limit of conditional expression (4), or is equal to or falls below the lower limit of conditional expression (4), coma cannot be excellently corrected over wide angle of view, so that it is undesirable.

Moreover, a wide-angle lens WL according to the present embodiment preferably satisfies the following conditional expression (5):

$$0.7 < D/f < 1.2 \quad (5)$$

where D denotes a distance along the optical axis between the object side lens surface of the first lens L1 and the image side lens surface of the sixth lens L6, and f denotes a focal length at d-line of the wide-angle lens WL.

Conditional expression (5) defines a ratio of the distance D along the optical axis between the object side lens surface of the first lens L1 and the image side lens surface of the sixth lens L6 to the focal length f at d-line of the wide-angle lens WL. When the value of conditional expression (5) is equal to or exceeds the upper limit of conditional expression (5), off-axis aberrations, in particular, astigmatism becomes worse, so that it is undesirable. On the other hand, when the value of conditional expression (5) is equal to or falls below the lower limit of conditional expression (5), spherical aberration becomes difficult to be corrected, so that it is undesirable.

Moreover, in a wide-angle lens WL according to the present embodiment, with forming an aspherical surface on at least one lens surface of the sixth lens L6, it becomes possible to excellently correct barrel type distortion and spherical aberration.

Moreover, in a wide-angle lens WL according to the present embodiment, the fourth lens L4 is preferably cemented with the fifth lens L5. In a wide-angle lens WL according to the present embodiment, the distance along the optical axis between the fourth lens L4 and the fifth lens L5 has high sensitivity to optical performance. Accordingly, with cementing the fourth lens L4 with the fifth lens L5, it becomes possible to obtain stable optical performance upon manufacturing.

Figure 11A:
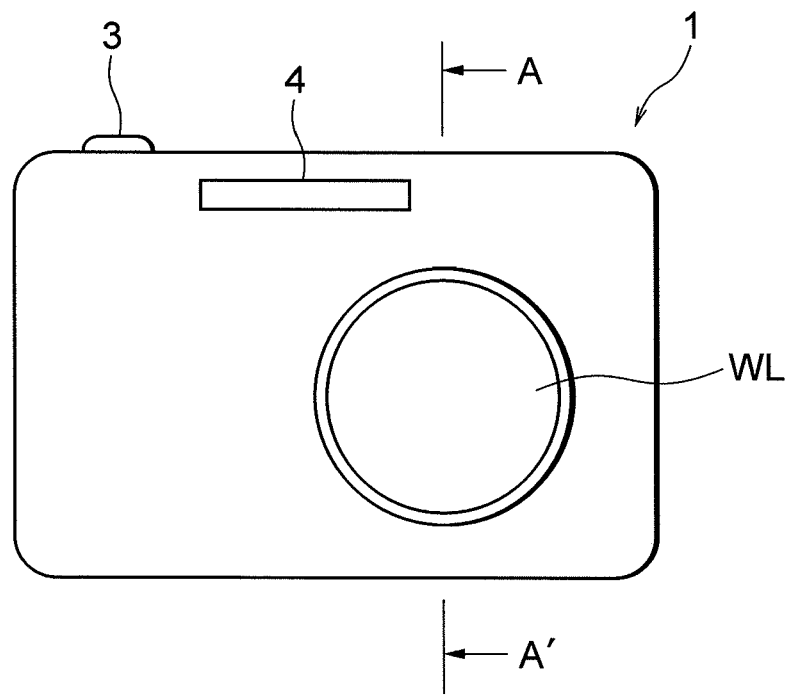
Figure 11B:
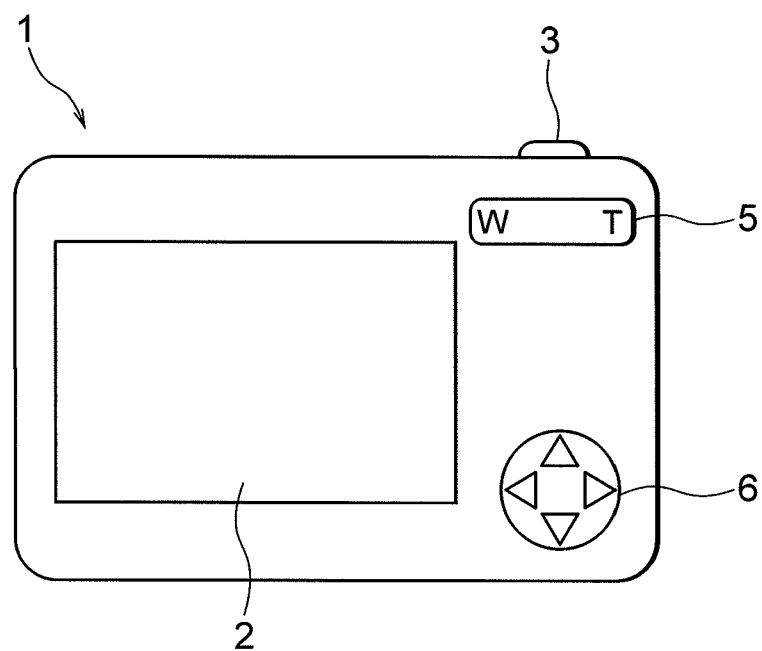
Figure 12:
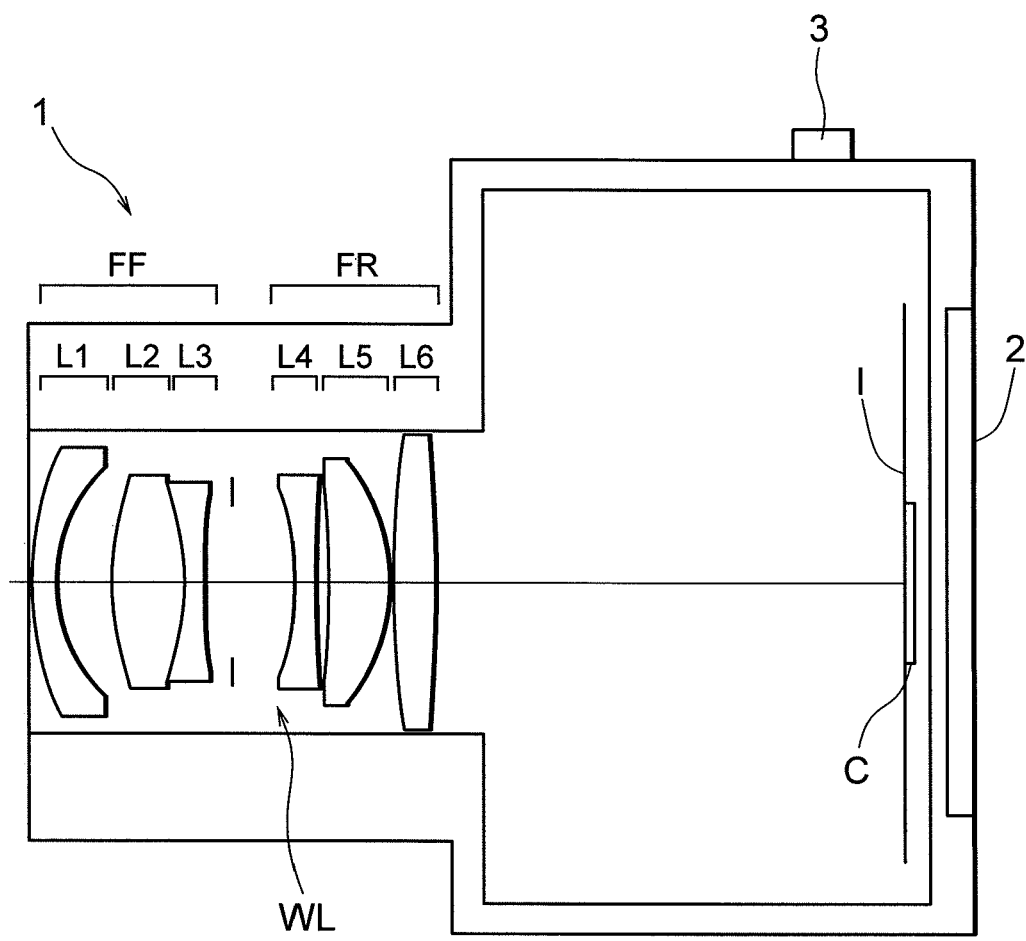
FIG. 12 is a sectional view along the line A-A' shown in FIG. 11A.

In FIGS. 11A, 11B and 12, construction of an electronic still camera 1 (hereinafter simply called a camera) is shown as an optical apparatus equipped with the above-described wide-angle lens WL. In the camera 1, when a power switch button (not shown) is pressed, a shutter (not shown) of an image-taking lens (the wide-angle lens WL) is opened, light rays from an object (not shown) are converged by the wide-angle lens WL, and an image is formed on an imaging device C (such as a CCD, or CMOS) disposed on the image plane I. The object image formed on the imaging device C is displayed on a liquid crystal monitor 2 disposed backside of the camera 1. After fixing the composition of the object image with observing the liquid crystal monitor 2, the photographer depresses a release button 3 to take a picture of the object image by the imaging device C, and stores in a memory (not shown).

In the camera 1, the following members are disposed such as an auxiliary light emitter 4 that emits auxiliary light when the object is dark, a W-T button 5 that makes the wide-angle lens WL carry out zooming between a wide-angle end state (W) and a telephoto end state (T), and a function button 6 that is used for setting various conditions of the camera 1. Incidentally, the camera 1 may be a so-called single-lens reflex camera equipped with a semi-transparent mirror, a focusing screen, a pentagonal roof prism, and an eyepiece. Moreover, the wide-angle lens WL may be used as an interchangeable lens removably attached to the single-lens reflex camera.

Incidentally, the following description may suitably be applied within limits that do not deteriorate optical performance.

In the above-described explanations and the following Examples, although a six-lens configuration is shown, the present application can be applied to other lens configurations such as a seven-lens configuration or an eight-lens configuration. Moreover, a lens configuration that a lens or a lens group is added to the object side, or a lens configuration that a lens or a lens group is added to the most image side may be possible. Incidentally, a lens group is defined as a portion having at least one lens that is separated by an air space that varies upon zooming.

Moreover, a single lens, a plurality of lenses, a lens group, or a portion of a lens group may be moved along the optical axis as a focusing lens group, thereby carrying out focusing from an infinitely distant object to a close object. In this case, the focusing lens group can be used for auto focus, and suitable for being driven by a motor such as an ultrasonic motor. It is particularly preferable that the rear lens group FR (the fourth lens L4 through the sixth lens L6) or the whole of the lens is used as the focusing lens group. Alternatively, only the sixth lens L6 may be used as the focusing lens group.

A lens, a lens group or a portion of a lens group may be shifted in a direction having a component perpendicular to the optical axis, or tilted (swayed) in a plane including the optical axis as a vibration reduction lens group for correcting an image blur caused by a camera shake. It is particularly preferable that the rear lens group FR (the fourth lens L4 through the sixth lens L6) is used as a vibration reduction lens group.

Moreover, any lens surface may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

An antireflection coating having high transmittance over a broad wavelength range may be applied to each lens surface to reduce flare or ghost images, so that high optical performance with a high contrast can be achieved.

Above-described each example only shows a specific example for the purpose of better understanding of the present invention. Accordingly, it is needless to say that the invention in its broader aspect is not limited to the specific details and representative devices shown and described herein.

Figure 13:
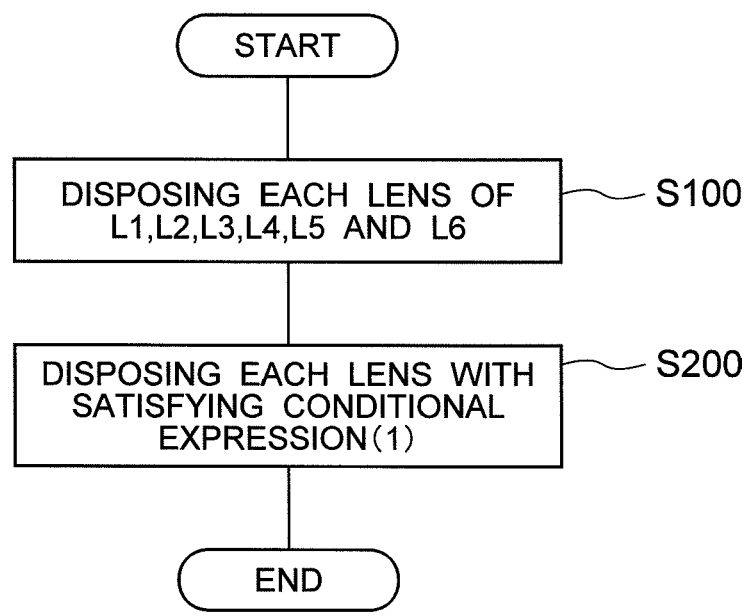
FIG. 13 is a flowchart showing a method for manufacturing a lens system according to the present embodiment.

Then, an outline of a method for manufacturing the lens system according to the present embodiment is explained below with reference to FIG. 13. At first, each lens is prepared (Step S100). Specifically, in the present embodiment, in order from an object side, a negative meniscus lens having a convex surface facing the object side is disposed as a first lens L1, a cemented lens component constructed by a second lens L2 composed of a double convex lens cemented with a third lens L3 composed of a double concave lens is disposed as a cemented lens component CL1 having positive refractive power as a whole, a double concave lens is disposed as a fourth lens L4, a positive meniscus lens having a convex surface facing the image side is disposed as a fifth lens L5, and a double convex lens is disposed as a sixth lens L6. In this manner, with disposing each lens, the lens system is manufactured.

In this instance, each lens is disposed with satisfying the above-described conditional expression (1), where d2 denotes a distance along the optical axis between the first lens L1 and the second lens L2, and f1 denotes a focal length of the first lens L1 (Step S200).

EXAMPLE

Each example according to the present application is explained below with reference to accompanying drawings.

Figure 5:
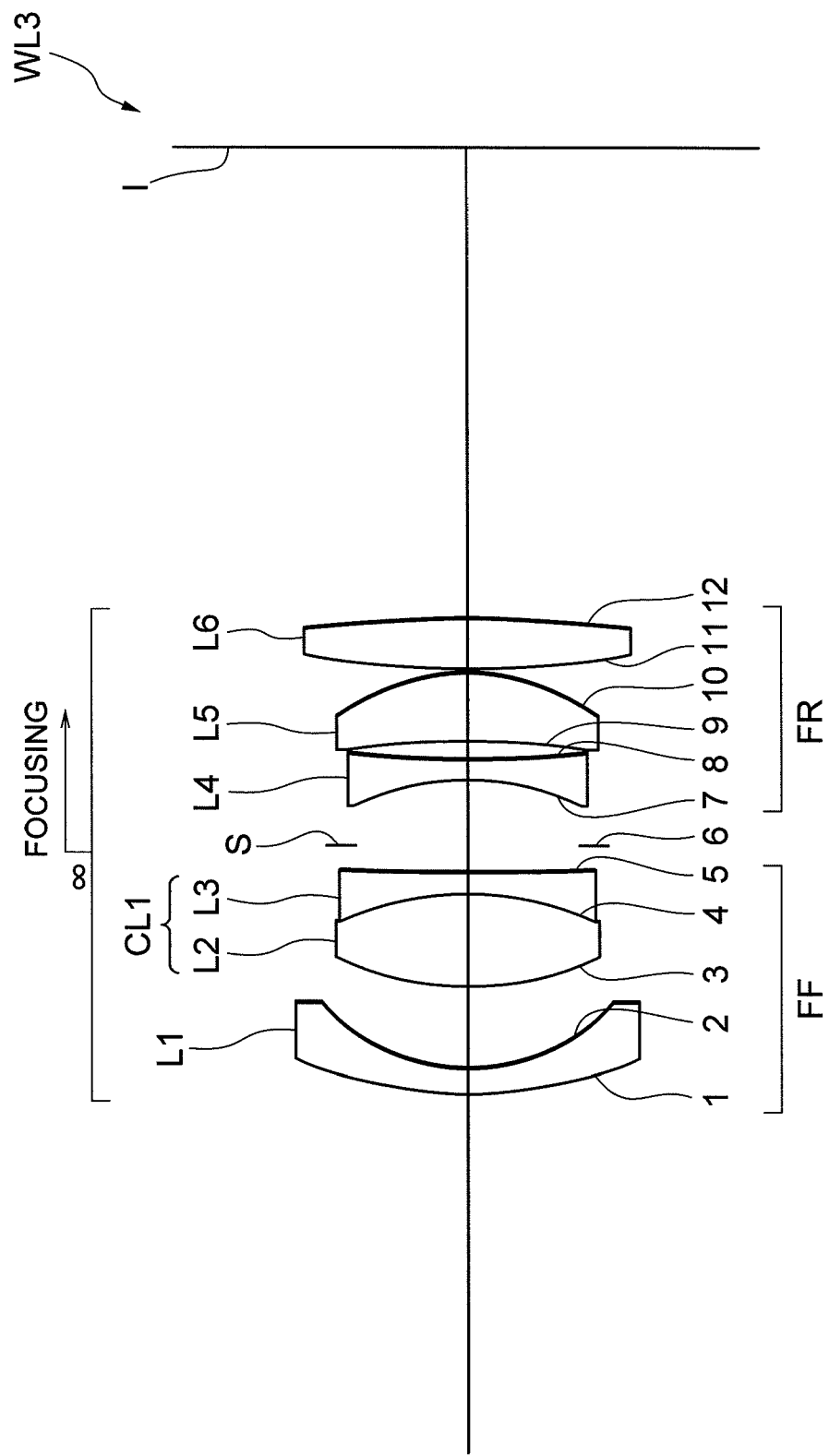
FIG. 5 is a sectional view showing a wide-angle lens according to Example 3.

FIGS. 1, 3, 5, 7 and 9 show lens configurations of wide-angle lenses WL1, WL2, WL3, WL4 and WL5, respectively. As shown in FIGS. 1 and 5, each of wide-angle lenses WL1 and WL3 according to Examples 1 and 3, respectively, is composed of, in order from the object side, a first lens L1 constructed by a negative meniscus lens having a convex surface facing the object side, a cemented lens component CL1 having positive refractive power as a whole constructed by a second lens L2 having positive refractive power cemented with a third lens L3 having negative refractive power, a fourth lens L4 having negative refractive power, a fifth lens having positive refractive power, and a sixth lens L6 having positive refractive power. On the other hand, each of wide-angle lenses WL2, WL4 and WL5 according to Examples 2, 4 and 5, respectively, is composed of, in order from the object side, a first lens L1 constructed by a negative meniscus lens having a convex surface facing the object side, a cemented lens component CL1 having positive refractive power as a whole constructed by a second lens L2 having positive refractive power cemented with a third lens L3 having negative refractive power, a cemented lens component CL2 constructed by a fourth lens L4 having negative refractive power cemented with a fifth lens L5 having positive refractive power, and a sixth lens L6 having positive refractive power. In each of wide-angle lenses WL1 through WL5 according to Examples 1 through 5, respectively, a front lens group FF is composed of the first lens L1 through the third lens L3, and a rear lens group FR is composed of the fourth lens L4 through the sixth lens L6.

Moreover, focusing from an infinitely distant object to a close object is carried out by moving the whole lens system along the optical axis in Examples 1 through 4, and the rear lens group FR along the optical axis in Example 5. An aperture stop S is disposed between the cemented lens component CL1 and the fourth lens L4.

In Examples 4 and 5, at least one lens surface of the sixth lens L6 disposed most image side is an aspherical surface. In Examples 4 and 5, an aspherical surface is expressed by the following expression (a):

$$S(y)=(y^2/r)/(1+(1-\kappa\times(y^2/r^2))^{1/2})+A4\times y^4+A6\times y^6+A8\times y^8+A10\times y^{10} \quad (a)$$

where "y" denotes a vertical height from the optical axis, S(y) denotes a sag amount which is a distance along the optical axis from the tangent surface at the vertex of the aspherical surface to the aspherical surface at the vertical height "y", "r" denotes a radius of curvature of a reference sphere (paraxial radius of curvature), "κ" denotes a conical coefficient, and "An" denotes an aspherical coefficient of n-th order. In the following Examples, "E−n" denotes "×10$^{-n}$". Each aspherical surface is expressed in (Lens Data) by attaching "*" to the left side of the surface number.

Example 1

FIG. 1 shows a lens configuration of a wide-angle lens WL1 according to Example 1. In the wide-angle lens WL1 shown in FIG. 1, a first lens L1 is composed of a negative meniscus lens having a convex surface facing an object side. A second lens L2 is composed of a double convex lens, and a third lens L3 is composed of a double concave lens. With cementing the second lens L2 with the third lens L3, a cemented lens component CL1 is constructed. A fourth lens L4 is composed of a double concave lens. A fifth lens L5 is composed of a positive meniscus lens having a convex surface facing an image side. A sixth lens L6 is composed of a double convex lens.

Various values associated with the wide-angle lens WL1 according to Example 1 are listed in Table 1. In (Specifications), f denotes a focal length of the whole lens system, Bf denotes a back focal length, FNO denotes an f-number, Y denotes an image height, and 2ω denotes an angle of view (unit: degree). In (Lens Data), "i" shows the lens surface number counted in order from the object side along a direction in which the light beams travel, "d" shows a distance along the optical axis to the next optical surface, "nd" and "vd" show a refractive index and an Abbe number at d-line (wavelength λ=587.6 nm), respectively. In (Values for Conditional Expressions), values with respect to conditional expressions are shown. In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. Incidentally, r=∞ represents a plane surface, and the refractive index of the air nd=1.00000 is omitted. The explanation of reference symbols is the same in the other Examples.

TABLE 1

(Specifications)

f = 24.600
Bf = 25.917
FNO = 2.89
Y = 14.2
2ω = 61.08

(Lens Data)

| i | r | d | vd | nd |
|---|---|---|----|----|
| 1 | 19.2360 | 1.4000 | 63.38 | 1.618000 |
| 2 | 8.9976 | 3.0000 | | |
| 3 | 16.9627 | 4.0000 | 40.94 | 1.806100 |
| 4 | −15.0170 | 1.2000 | 38.02 | 1.603420 |
| 5 | 44.6376 | 1.4000 | | |
| 6 | ∞ | 3.6000 | Aperture Stop S | |
| 7 | −14.2114 | 1.2000 | 25.43 | 1.805180 |
| 8 | 94.3840 | 0.6000 | | |
| 9 | −54.4047 | 3.5000 | 53.85 | 1.713000 |
| 10 | −10.6526 | 0.1000 | | |
| 11 | 54.8584 | 2.5000 | 50.24 | 1.720000 |
| 12 | −77.9901 | (Bf) | | |

(Values for Conditional Expressions)

(1) d2/(−f1) = 0.104
(2) (r2 + r1)/(r2 − r1) = −2.758
(3) fb/fa = 0.545
(4) (rb + r3)/(rb − r3) = −0.229
(5) D/f = 0.915

Figure 2:
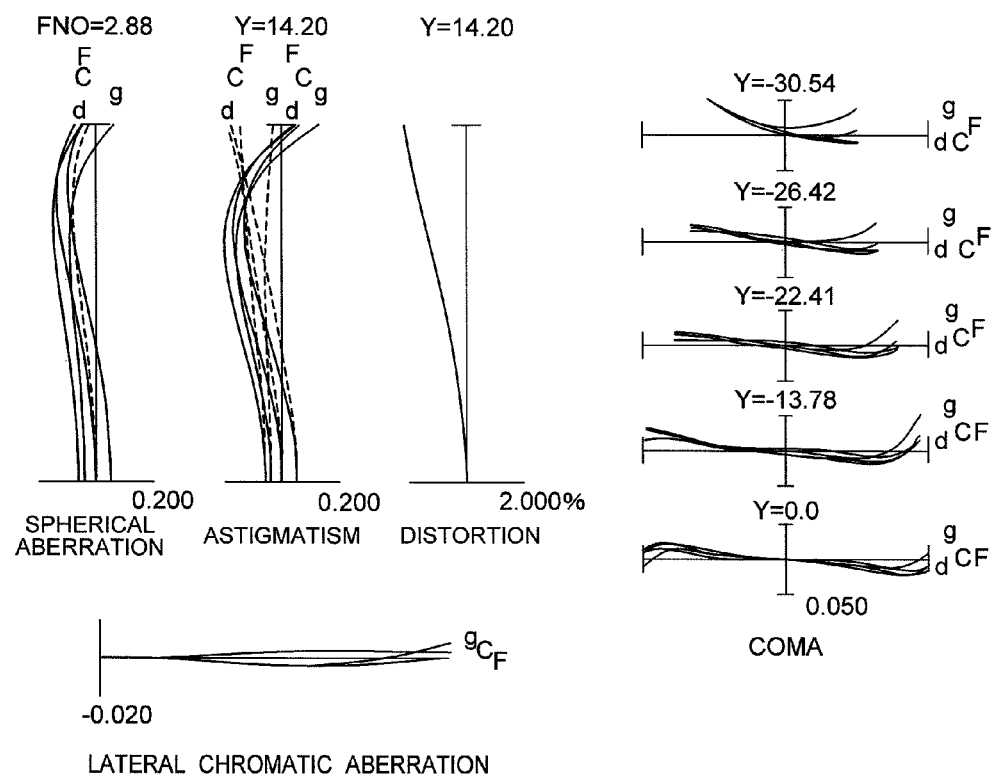
FIG. 2 shows graphs of various aberrations of the wide-angle lens according to Example 1 upon focusing on an infinitely distant object.

Graphs of various aberrations of the wide-angle lens WL1 according to Example 1 upon focusing on an infinitely distant object are shown in FIG. 2. In graphs showing astigmatism, a solid line indicates a sagittal image plane, and a broken line indicates a meridional image plane. In respective graphs, FNO denotes an f-number, Y denotes an image height, d denotes an aberration curve at d-line (wavelength λ=587.6 nm), g denotes an aberration curve at g-line (wavelength λ=435.8 nm), C denotes an aberration curve at C-line (wavelength λ=656.3 nm), and F denotes an aberration curve at F-line (wavelength λ=486.1 nm). As is apparent from various graphs, the wide-angle lens WL1 according to Example 1 shows superb optical performance as a result of good corrections to various aberrations.

Example 2

Figure 3:
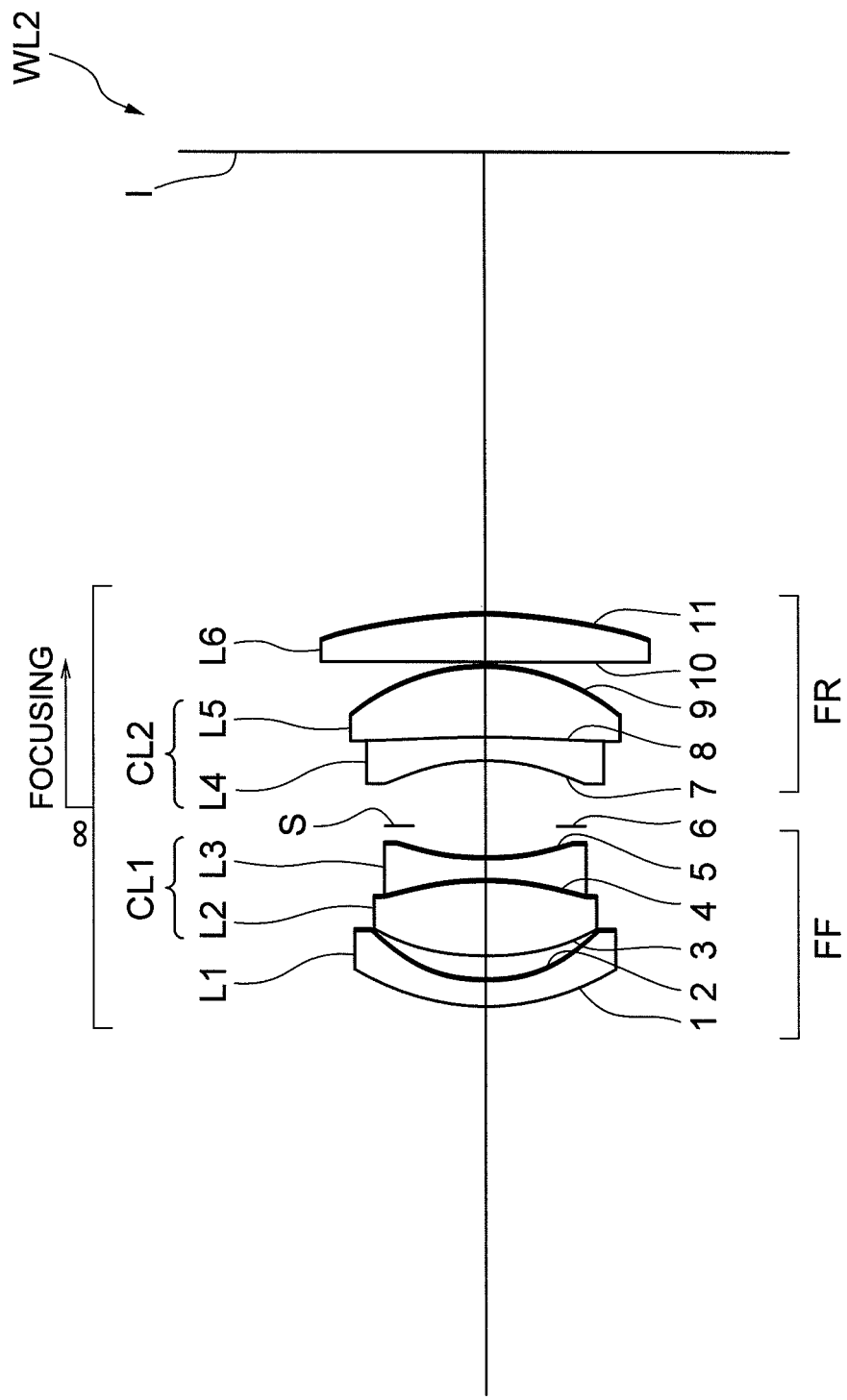
FIG. 3 is a sectional view showing a wide-angle lens according to Example 2.

FIG. 3 shows a lens configuration of a wide-angle lens WL2 according to Example 2. In the wide-angle lens WL2 shown in FIG. 3, a first lens L1 is composed of a negative meniscus lens having a convex surface facing an object side. A second lens L2 is composed of a double convex lens, and a third lens L3 is composed of a double concave lens. With cementing the second lens L2 with the third lens L3, a cemented lens component CL1 is constructed. A fourth lens L4 is composed of a negative meniscus lens having a convex surface facing an image side, and a fifth lens L5 is composed of a positive meniscus lens having a convex surface facing the image side. With cementing the fourth lens L4 with the fifth lens L5, a cemented lens component CL2 is constructed. A sixth lens L6 is composed of a double convex lens.

Various values associated with the wide-angle lens WL2 according to Example 2 are listed in Table 2.

TABLE 2

(Specifications)

f = 24.600
Bf = 23.689
FNO = 2.83
Y = 14.2
2ω = 61.56

(Lens Data)

| i | r | d | vd | nd |
|---|---|---|----|----|
| 1 | 13.3184 | 1.4000 | 63.38 | 1.618000 |
| 2 | 8.1256 | 1.2000 | | |
| 3 | 13.2157 | 4.0000 | 40.94 | 1.806100 |
| 4 | −17.4639 | 1.2000 | 38.02 | 1.603420 |
| 5 | 14.3964 | 1.6000 | | |
| 6 | ∞ | 3.4000 | Aperture Stop S | |
| 7 | −11.8126 | 1.2000 | 25.43 | 1.805180 |
| 8 | −104.9584 | 3.8000 | 53.85 | 1.713000 |
| 9 | −10.7791 | 0.1000 | | |
| 10 | −12052.4180 | 2.6000 | 50.24 | 1.720000 |
| 11 | −28.0872 | (Bf) | | |

(Values for Conditional Expressions)

(1) d2/(−f1) = 0.032
(2) (r2 + r1)/(r2 − r1) = −4.130
(3) fb/fa = 0.179
(4) (rb + r3)/(rb − r3) = −0.102
(5) D/f = 0.833

Figure 4:
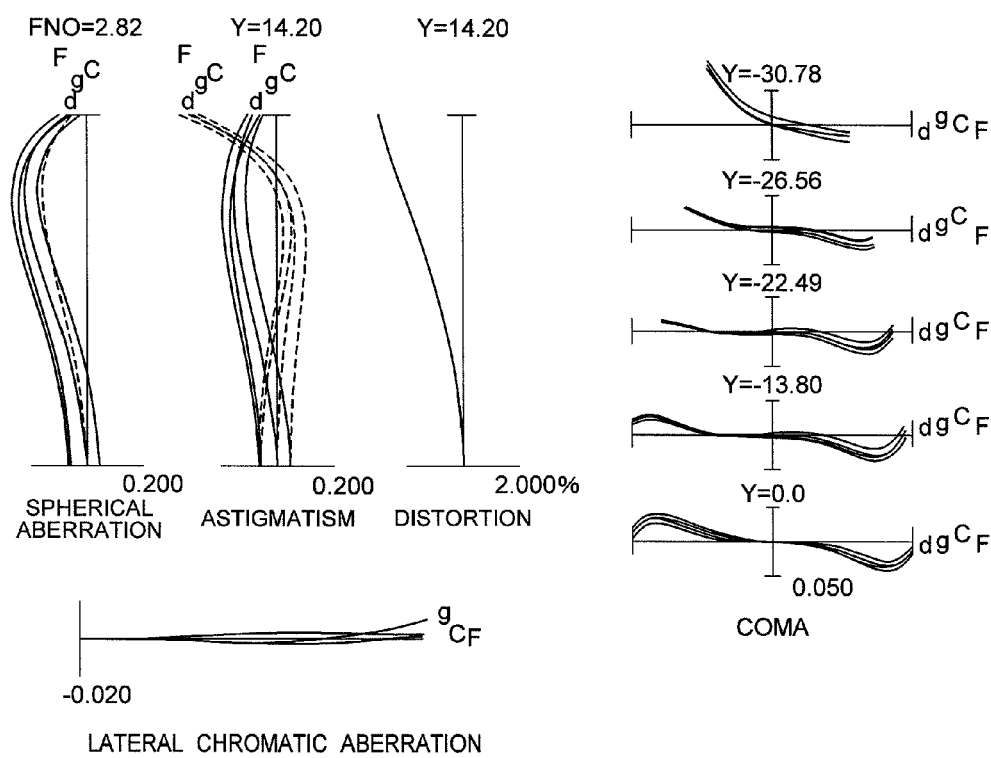
FIG. 4 shows graphs of various aberrations of the wide-angle lens according to Example 2 upon focusing on an infinitely distant object.

Graphs of various aberrations of the wide-angle lens WL2 according to Example 2 upon focusing on an infinitely distant object are shown in FIG. 4. As is apparent from various graphs, the wide-angle lens WL2 according to Example 2 shows superb optical performance as a result of good corrections to various aberrations.

Example 3

FIG. 5 shows a lens configuration of a wide-angle lens WL3 according to Example 3. In the wide-angle lens WL3 shown in FIG. 5, a first lens L1 is composed of a negative meniscus lens having a convex surface facing an object side. A second lens L2 is composed of a double convex lens, and a third lens L3 is composed of a double concave lens. With cementing the second lens L2 with the third lens L3, a cemented lens component CL1 is constructed. A fourth lens L4 is composed of a double concave lens. A fifth lens L5 is composed of a positive meniscus lens having a convex surface facing an image side. A sixth lens L6 is composed of a double convex lens.

Various values associated with the wide-angle lens WL3 according to Example 3 are listed in Table 3.

TABLE 3

(Specifications)

f = 24.600
Bf = 25.182
FNO = 2.08
Y = 14.2
2ω = 61.09

(Lens Data)

| i | r | d | vd | nd |
|---|---|---|---|---|
| 1 | 25.5121 | 1.4000 | 63.38 | 1.618000 |
| 2 | 10.8774 | 4.4000 | | |
| 3 | 17.9543 | 5.0000 | 40.94 | 1.806100 |
| 4 | −17.7814 | 1.2000 | 36.26 | 1.620040 |
| 5 | 180.4056 | 1.4000 | | |
| 6 | ∞ | 3.6000 | Aperture Stop S | |
| 7 | −14.8153 | 1.2000 | 25.43 | 1.805180 |
| 8 | 52.9664 | 0.9000 | | |
| 9 | −49.0872 | 3.8000 | 53.85 | 1.713000 |
| 10 | −11.7932 | 0.1000 | | |
| 11 | 46.6789 | 2.8000 | 50.24 | 1.720000 |
| 12 | −70.7593 | (Bf) | | |

(Values for Conditional Expressions)

(1) d2/(−f1) = 0.138
(2) (r2 + r1)/(r2 − r1) = −2.487
(3) fb/fa = 1.062
(4) (rb + r3)/(rb − r3) = −0.207
(5) D/f = 1.049

Figure 6:
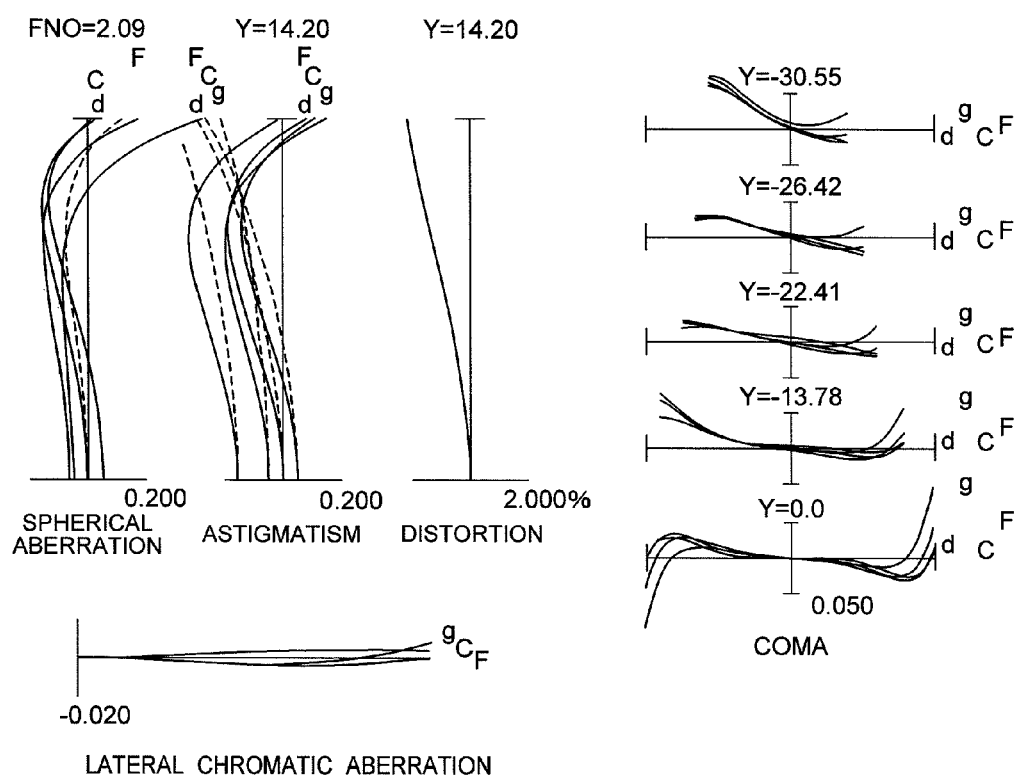
FIG. 6 shows graphs of various aberrations of the wide-angle lens according to Example 3 upon focusing on an infinitely distant object.

Graphs of various aberrations of the wide-angle lens WL3 according to Example 3 upon focusing on an infinitely distant object are shown in FIG. 6. As is apparent from various graphs the wide-angle lens WL3 according to Example 3 shows superb optical performance as a result of good corrections to various aberrations.

Example 4

Figure 7:
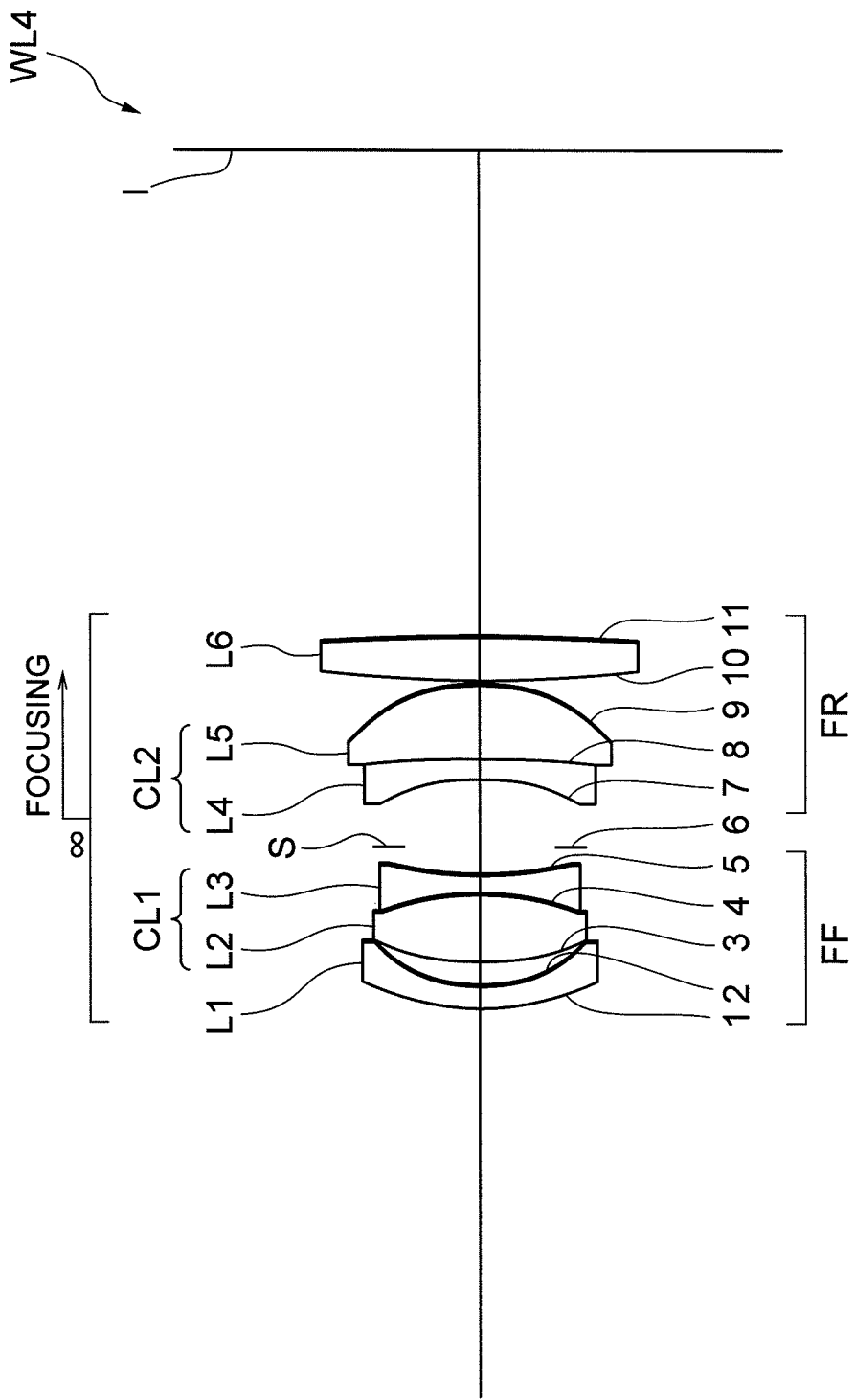
FIG. 7 is a sectional view showing a wide-angle lens according to Example 4.

FIG. 7 shows a lens configuration of a wide-angle lens WL4 according to Example 4. In the wide-angle lens WL4 shown in FIG. 7, a first lens L1 is composed of a negative meniscus lens having a convex surface facing an object side. A second lens L2 is composed of a double convex lens, and a third lens L3 is composed of a double concave lens. With cementing the second lens L2 with the third lens L3, a cemented lens component CL1 is constructed. A fourth lens L4 is composed of a negative meniscus lens having a convex surface facing an image side, and a fifth lens L5 is composed of a positive meniscus lens having a convex surface facing the image side. With cementing the fourth lens L4 with the fifth lens L5, a cemented lens component CL2 is constructed. A sixth lens L6 is composed of a double convex lens, and the object side lens surface (surface number 10) of the double convex lens is an aspherical surface.

Various values associated with the wide-angle lens WL4 according to Example 4 are listed in Table 4.

TABLE 4

(Specifications)

f = 24.600
Bf = 25.106
FNO = 2.87

TABLE 4-continued

Y = 14.2
2ω = 61.15

(Lens Data)

| i | r | d | vd | nd |
|---|---|---|---|---|
| 1 | 14.6010 | 1.2000 | 63.38 | 1.618000 |
| 2 | 7.9456 | 1.2000 | | |
| 3 | 14.3813 | 3.6000 | 40.94 | 1.806100 |
| 4 | −15.6036 | 1.0000 | 38.02 | 1.603420 |
| 5 | 19.6400 | 1.4000 | | |
| 6 | ∞ | 3.6000 | Aperture Stop S | |
| 7 | −10.9913 | 1.0000 | 25.43 | 1.805180 |
| 8 | −57.2447 | 4.0000 | 53.85 | 1.713000 |
| 9 | −9.5054 | 0.1000 | | |
| *10 | 69.2380 | 2.4000 | 53.22 | 1.693500 |
| 11 | −98.3892 | (Bf) | | |

(Aspherical Surface Data)
Surface Number: 10

κ = −61.7366
A4 = 0.00000E+00
A6 = −8.39050E−08
A8 = 0.00000E+00
A10 = 0.00000E+00

(Values for Conditional Expressions)

(1) d2/(−f1) = 0.040
(2) (r2 + r1)/(r2 − r1) = −3.388
(3) fb/fa = 0.182
(4) (rb + r3)/(rb − r3) = −0.204
(5) D/f = 0.793

Figure 8:
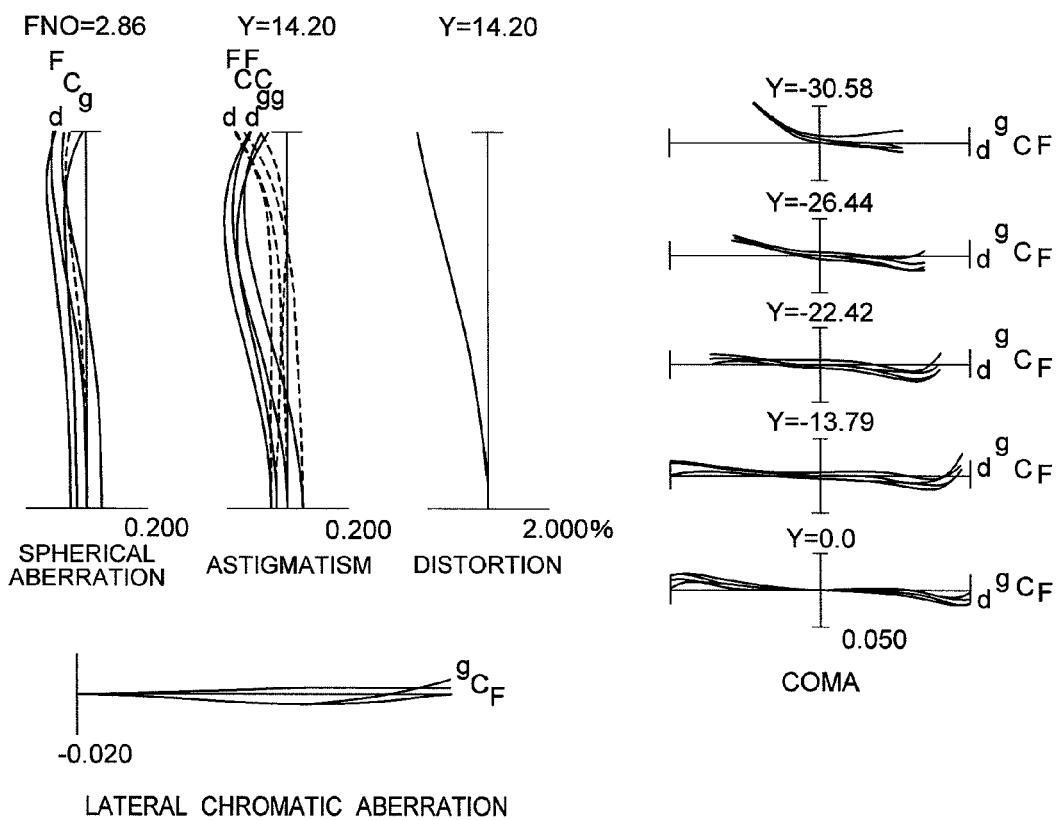
FIG. 8 shows graphs of various aberrations of the wide-angle lens according to Example 4 upon focusing on an infinitely distant object.

Graphs of various aberrations of the wide-angle lens WL4 according to Example 4 upon focusing on an infinitely distant object are shown in FIG. 8. As is apparent from various graphs, the wide-angle lens WL4 according to Example 4 shows superb optical performance as a result of good corrections to various aberrations.

Example 5

Figure 9:
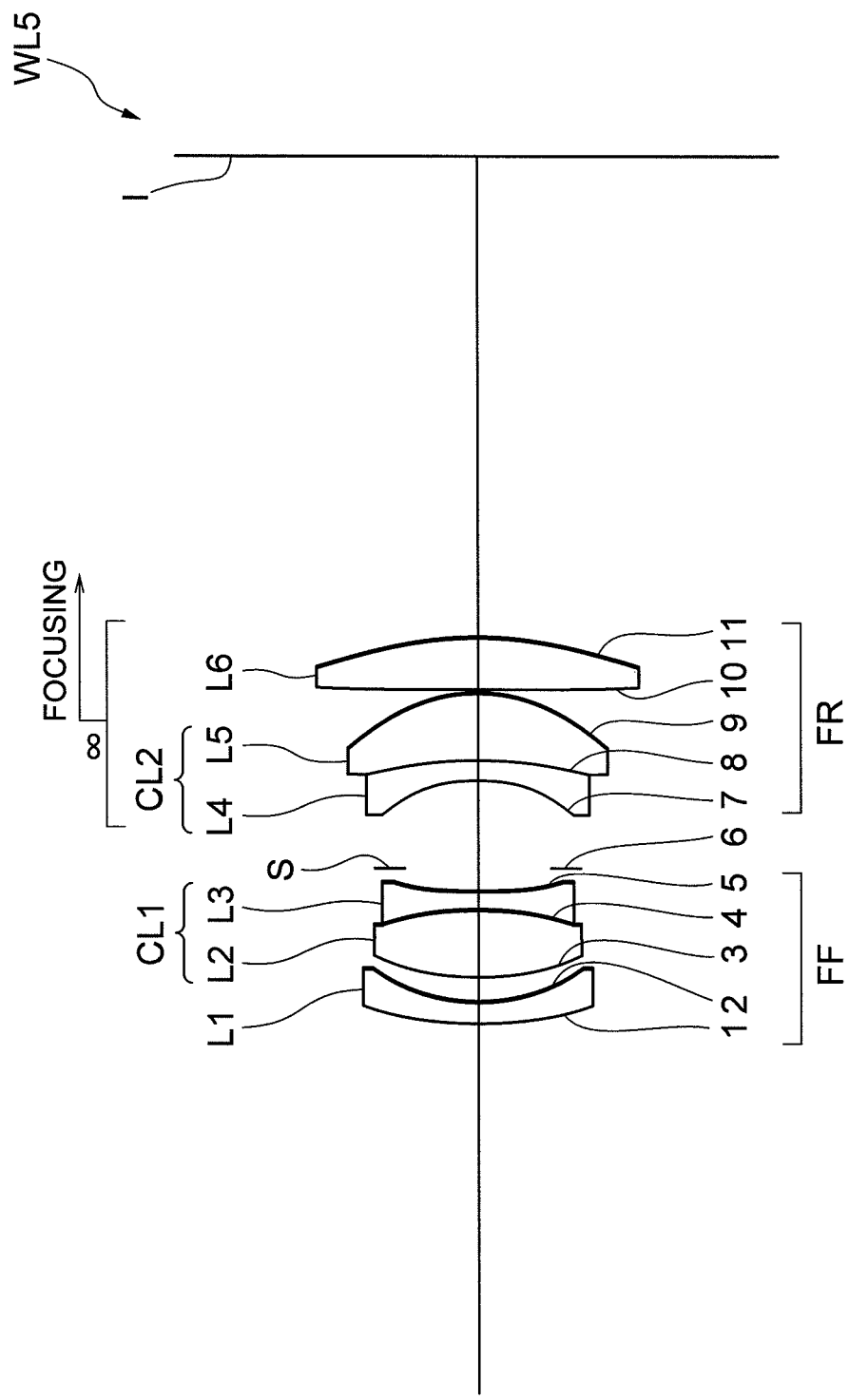
FIG. 9 is a sectional view showing a wide-angle lens according to Example 5.

FIG. 9 shows a lens configuration of a wide-angle lens WL5 according to Example 5. In the wide-angle lens WL5 shown in FIG. 9, a first lens L1 is composed of a negative meniscus lens having a convex surface facing an object side. A second lens L2 is composed of a double convex lens, and a third lens L3 is composed of a double concave lens. With cementing the second lens L2 with the third lens L3, a cemented lens component CL1 is constructed. A fourth lens L4 is composed of a negative meniscus lens having a convex surface facing an image side, and a fifth lens L5 is composed of a positive meniscus lens having a convex surface facing the image side. With cementing the fourth lens L4 with the fifth lens L5, a cemented lens component CL2 is constructed. A sixth lens L6 is composed of a double convex lens, and the image side lens surface (surface number 11) of the double convex lens is an aspherical surface.

Various values associated with the wide-angle lens WL5 according to Example 5 are listed in Table 5.

TABLE 10

(Specifications)

f = 24.600
Bf = 24.965
FNO = 2.80
Y = 14.2
2ω = 61.32

TABLE 10-continued (Lens Data)

| i | r | d | vd | nd |
|---|---|---|---|---|
| 1 | 19.9408 | 1.2000 | 63.38 | 1.618000 |
| 2 | 9.9956 | 1.2000 | | |
| 3 | 13.6758 | 3.6000 | 40.94 | 1.806100 |
| 4 | −19.1927 | 1.0000 | 38.02 | 1.603420 |
| 5 | 20.5406 | 1.2000 | | |
| 6 | ∞ | 4.6000 | Aperture Stop S | |
| 7 | −8.2347 | 1.0000 | 25.43 | 1.805180 |
| 8 | −28.5271 | 3.6000 | 53.85 | 1.713000 |
| 9 | −9.9156 | 0.1000 | | |
| 10 | 275.9669 | 2.8000 | 53.22 | 1.693500 |
| *11 | −22.5820 | (Bf) | | |

(Aspherical Surface Data)
Surface Number: 11

κ = −0.5188
A4 = 0.00000E+00
A6 = 6.60150E−08
A8 = 0.00000E+00
A10 = 0.00000E+00

(Values for Conditional Expressions)

(1) d2/(−f1) = 0.035
(2) (r2 + r1)/(r2 − r1) = −3.010
(3) fb/fa = 0.350
(4) (rb + r3)/(rb − r3) = −0.159
(5) D/f = 0.825

Figure 10:
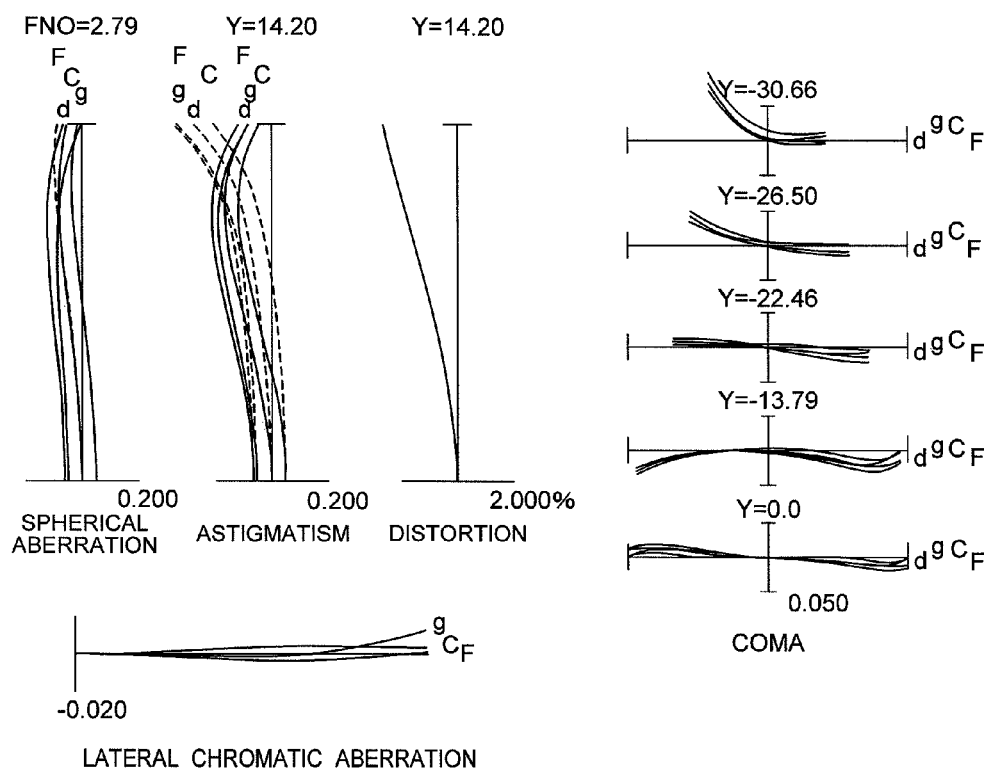
FIG. 10 shows graphs of various aberrations of the wide-angle lens according to Example 5 upon focusing on an infinitely distant object.

Graphs of various aberrations of the wide-angle lens WL5 according to Example 5 upon focusing on an infinitely distant object are shown in FIG. 10. As is apparent from various graphs the wide-angle lens WL5 according to Example 5 has superb optical performance as a result of excellent correction to various aberrations.

What is claimed is:

1. A lens system comprising, in order from an object side:
a first lens constructed by a negative meniscus lens having a convex surface facing the object side;
a cemented lens component having positive refractive power as a whole constructed by a second lens having positive refractive power cemented with a third lens having negative refractive power;
a fourth lens having negative refractive power;
a fifth lens having positive refractive power; and
a sixth lens having positive refractive power, and
the following conditional expression being satisfied:

$$0.01 < d2/(-f1) < 0.15$$

where d2 denotes a distance along an optical axis between the first lens and the second lens, and f1 denotes a focal length of the first lens.

2. The lens system according to claim 1, wherein the following conditional expression is satisfied:

$$-5 < (r2+r1)/(r2-r1) < -2$$

where r1 denotes a radius of curvature of the object side lens surface of the first lens, and r2 denotes a radius of curvature of the image side lens surface of the first lens.

3. The lens system according to claim 1, wherein an aperture stop is disposed between the cemented lens component and the fourth lens.

4. The lens system according to claim 1, wherein the following conditional expression is satisfied:

$$0.0 < fb/fa < 1.2$$

where fa denotes a focal length at d-line of a front lens group composed of the first lens and the cemented lens component, and fb denotes a focal length at d-line of a rear lens group composed of the fourth lens, the fifth lens and the sixth lens.

5. The lens system according to claim 1, wherein the following conditional expression is satisfied:

$$-0.25 < (rb+r3)/(rb-r3) < 0.00$$

where rb denotes a radius of curvature of the image side lens surface of the fifth lens, and r3 denotes a radius of curvature of the object side lens surface of the second lens.

6. The lens system according to claim 1, wherein the following conditional expression is satisfied:

$$0.7 < D/f < 1.2$$

where D denotes a distance along the optical axis between the object side lens surface of the first lens and the image side lens surface of the sixth lens, and f denotes a focal length of the lens system.

7. The lens system according to claim 1, wherein at least one lens surface of the sixth lens is an aspherical surface.

8. The lens system according to claim 1, wherein the fourth lens is cemented with the fifth lens.

9. A wide-angle lens having a configuration of the lens system according to claim 1.

10. An optical apparatus equipped with the lens system according to claim 1.

11. A method for manufacturing a lens system comprising steps of:
disposing, in order from an object side, a first lens constructed by a negative meniscus lens having a convex surface facing the object side, a cemented lens component constructed by a second lens having positive refractive power cemented with a third lens having negative refractive power, a fourth lens having negative refractive power, a fifth lens having positive refractive power, and a sixth lens having positive refractive power; and
disposing each lens with satisfying the following conditional expression:

$$0.01 < d2/(-f1) < 0.15$$

where d2 denotes a distance along the optical axis between the first lens and the second lens, and f1 denotes a focal length at d-line of the first lens.

12. The method according to claim 11, further comprising a step of:
disposing each lens with satisfying the following conditional expression:

$$-5 < (r2+r1)/(r2-r1) < -2$$

where r1 denotes a radius of curvature of the object side lens surface of the first lens, and r2 denotes a radius of curvature of the image side lens surface of the first lens.

13. The method according to claim 11, further comprising a step of:
disposing an aperture stop between the cemented lens component and the fourth lens.

14. The method according to claim 11, further comprising a step of:
disposing each lens with satisfying the following conditional expression:

$$0.0 < fb/fa < 1.2$$

where fa denotes a focal length at d-line of a front lens group composed of the first lens and the cemented lens component, and fb denotes a focal length at d-line of a rear lens group composed of the fourth lens, the fifth lens and the sixth lens.

15. The method according to claim 11, further comprising a step of:

disposing each lens with satisfying the following conditional expression:

$$-0.25 < (rb+r3)/(rb-r3) < 0.00$$

where rb denotes a radius of curvature of the image side lens surface of the fifth lens, and r3 denotes a radius of curvature of the object side lens surface of the second lens.

16. The method according to claim 11, further comprising a step of:

disposing each lens with satisfying the following conditional expression:

$$0.7 < D/f < 1.2$$

where D denotes a distance along the optical axis between the object side lens surface of the first lens and the image side lens surface of the sixth lens, and f denotes a focal length of the lens system.

* * * * *